C. D. CHELCUT.
NUT LOCK.
APPLICATION FILED AUG. 2, 1918.

1,334,227.  Patented Mar. 16, 1920.

Inventor
C.D. Chelcut.
By Victor J. Evans
Attorney

UNITED STATES PATENT OFFICE.

CHAUNCEY D. CHELCUT, OF PITTSBURGH, PENNSYLVANIA.

NUT-LOCK.

1,334,227.

Specification of Letters Patent. Patented Mar. 16, 1920.

Application filed August 2, 1918. Serial No. 247,988.

*To all whom it may concern:*

Be it known that I, CHAUNCEY D. CHELCUT, a citizen of the United States, residing at Pittsburgh, in the county of Allegheny and State of Pennsylvania, have invented new and useful Improvements in Nut-Locks, of which the following is a specification.

This invention relates to a nut lock and has for its primary object to provide a nut lock of simple construction that may be manufactured in an inexpensive manner.

An object of the invention is to provide a nut lock capable of accommodating slight adjustments between the nut and the head of the bolt.

With these and other objects in view the invention will be better understood from the following detailed description taken in connection with the accompanying drawing wherein.

Figure 1:
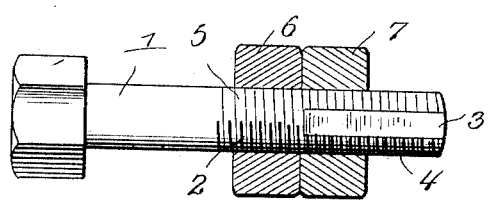
Figure 1 is a side elevation of the bolt showing the nuts in cross section.
Figure 2:
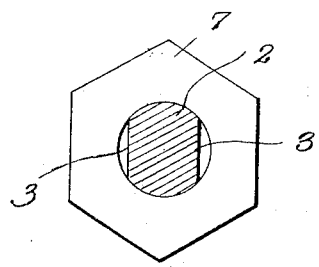
Fig. 2 is a cross sectional view.
Figure 3:
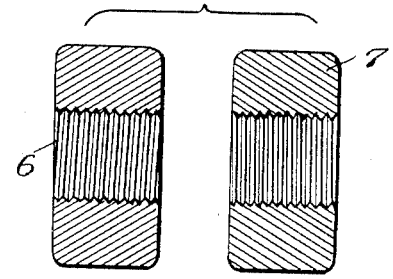
Fig. 3 is a sectional view of the nuts when removed from the bolt.

Again referring to the drawing the numeral 1 designates the bolt, the threaded shank 2 of which is flattened on two sides as indicated at 3 thus providing non-continuous threads 4 for the major portion of the length of the shank and continuous threads 5 for the remaining threaded portion of the shank. Threaded on the shank and adapted to come to rest in engagement with the continuous threads 5 is a right hand threaded nut 6 while engaging the non-continuous threads and adapted to move against the nut 6 is a left hand threaded nut 7. At this point I wish to call attention to the fact that the position of the nuts may be reversed; that is to say the left hand threaded nut may be arranged where the right hand threaded nut is illustrated in the drawing.

In concluding my description I wish to call attention to the fact that by having the nuts 6 and 7 oppositely threaded, the nuts will rotate in opposite directions when tightening the nuts on the bolt. This action is allowed for by flattening two sides of the bolt as indicated at 3. Thus it will be seen that should the nut 6 tend to untighten the frictional engagement of the same with the nut 7 will turn the latter in a direction to tighten and thus binding the nuts against accidental displacement.

From the foregoing description taken in connection with the accompanying drawing it should be apparent that I provide a simple, substantial and inexpensive type of nut lock in which slight adjustment of the binding nut 6 may be accommodated without interfering with the locking action of the nut. It is of course to be understood that the exact connection of the nut 7 with the bolt may be changed in other manners than that illustrated in the drawing as long as the same has an adjustable connection with the bolt and therefore I do not desire to be limited in any manner except as set forth in the claims hereunto appended.

Having described my invention, what I claim is:

1. In a nut lock, a bolt provided with a uni-directional thread of uniform depth mutilated at opposite sides of the bolt, and two nuts screwed upon said bolt, the threads of the inner nut corresponding to the threads of the bolt and the threads of the outer nut being reversely related to the threads of said inner nut so as to prevent reverse rotation of said nut upon the bolt.

2. In a nut lock, a bolt provided with a uni-directional thread, the threaded portion of said bolt being cut away at opposite sides of the bolt to mutilate the convolutions of the thread and the remaining portions of said convolutions being of uniform depth, and two oppositely threaded nuts screwed on said bolt in binding contact with each other.

3. In a nut lock, a bolt provided with a uni-directional thread, the threaded portion of said bolt being cut away at opposite sides of the bolt to mutilate the convolutions of the thread and the remaining portions of said convolutions being of uniform depth and width, and two oppositely threaded nuts screwed on said bolt in binding contact with each other.

4. A bolt provided with a standard thread only and having its opposite sides cut away to mutilate the convolutions of said thread so as to permit nuts threaded either similarly or oppositely to said bolt to be screwed upon the bolt.

In testimony whereof I affix my signature.

CHAUNCEY D. CHELCUT.